(12) United States Patent
Muise et al.

(10) Patent No.: US 6,338,234 B1
(45) Date of Patent: Jan. 15, 2002

(54) METHOD OF ENCAPSULATING SHIPPING CONTAINER BLANKS IN PLASTIC FILM

(75) Inventors: Herbert D. Muise, Tumwater; Amar N. Neogi, Seattle, both of WA (US)

(73) Assignee: Weyerhauser Company, Federal Way, WA (US)

( * ) Notice: Subject to any disclaimer, the term of this patent is extended or adjusted under 35 U.S.C. 154(b) by 0 days.

(21) Appl. No.: 09/449,259

(22) Filed: Nov. 24, 1999

(51) Int. Cl.[7] ............................................... B65B 61/02
(52) U.S. Cl. ........................... 53/411; 53/463; 493/110; 493/111
(58) Field of Search ................................. 493/110, 111, 493/83; 53/411, 463, 174

(56) References Cited

U.S. PATENT DOCUMENTS

| | | | |
|---|---|---|---|
| 3,406,052 A | 10/1968 | Peters | 156/198 |
| 3,809,223 A | * 5/1974 | Kendall | |
| 3,864,200 A | 2/1975 | Marshall | 161/135 |
| 3,922,362 A | * 11/1975 | Pierce | |
| 3,929,536 A | 12/1975 | Maughan | 156/85 |
| 4,551,123 A | 11/1985 | Inagaki | 493/108 |
| 4,722,474 A | 2/1988 | Dropsy | 229/125.35 |
| 5,009,308 A | * 4/1991 | Cullen et al. | |
| 5,108,355 A | * 4/1992 | Walsh | |
| 5,176,251 A | * 1/1993 | Davis et al. | |
| 5,240,111 A | * 8/1993 | Yamshita et al. | |
| 6,221,192 B1 | * 4/2001 | Walsh | |

FOREIGN PATENT DOCUMENTS

| | | | |
|---|---|---|---|
| FR | 2645831 | 10/1990 | ............ B65D/5/56 |
| WO | WO 90/09927 | 9/1990 | ............ B65D/65/40 |
| WO | WO 94/02364 | 2/1994 | ............ B65D/5/20 |

* cited by examiner

Primary Examiner—Eugene Kim
(74) Attorney, Agent, or Firm—Keith D. Gehr

(57) ABSTRACT

The invention is a method of overlaying a plastic film material on a shipping container blank whereby all surfaces and edges are sealed. A container subsequently made from the blank is rendered highly water resistant. The film material is applied to both sides of the blank and severed from the supply source. The covered blank is then heated above the softening point of the film. The film becomes bonded to the surfaces of the blank and sags around the edges and into any openings so that the film on the two sides of the blank come into contact and are sealed to each other. The edges and any slits and cutouts are then trimmed, as by a die cutter, while preserving the seals along the edges. Containers made by the process can generally be recycled, in contrast to wax or resin impregnated corrugated board.

12 Claims, 2 Drawing Sheets

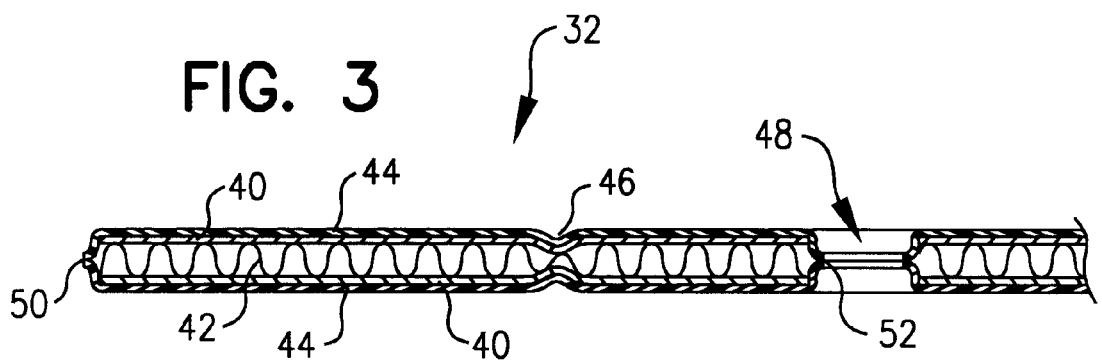
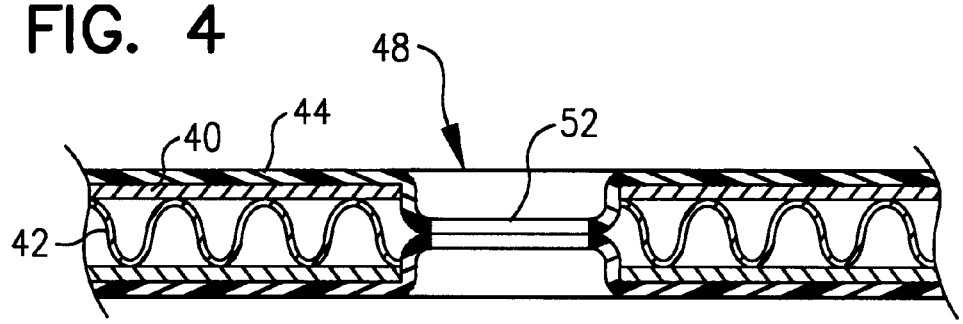

METHOD OF ENCAPSULATING SHIPPING CONTAINER BLANKS IN PLASTIC FILM

The present invention is directed to a method of overlaying a plastic film material on a shipping container blank whereby a container subsequently formed from the blank is rendered highly water resistant.

BACKGROUND OF THE INVENTION

Water resistant shipping containers are required for shipping many types of fresh produce. Containers used to date have principally been prepared by saturating the blank with melted wax before assembly. Other methods have included impregnation with a water resistant synthetic resin or coating the container with a thermoplastic material. In the latter case, forming watertight seals around the edges and any slits or openings has been a major problem. In most cases the resulting containers cannot be recycled and must be disposed of in a landfill.

One early method of plastic coating is seen in Peters, U.S. Pat. No. 3,406,052 where plastic material is applied by extruders depositing a thin film against both faces of a moving box blank. The extruded film is wider than the blank so that it hangs over all edges. These are then sealed with a flame. Alternatively, the edges of the blank may be crushed and sealed with a thermoplastic mixture. No provision was made for sealing any openings other than the edges.

Marshall, in U.S. Pat. No. 3,864,200, describes a box made using resin impregnated linerboards and a two layer corrugated medium having an asphalt barrier coating between the layers. All exposed edges are crushed for a width of about 0.5–1 inch and the asphalt bleeds through the corrugated medium to provide some sealing.

Maughan, in U.S. Pat. No. 3,929,536, shows a moisture resistant corner post usable in packaging materials. This is made from multiple layers of corrugated paperboard fully enclosed in a plastic film. A vacuum former preferably is used to bring the heated shrink wrap plastic film into conformation. End seals are made by an undisclosed method.

Inagaki discloses in U.S. Pat. No. 4,551,123 a tubular paper container sealed within a thermoplastic film. Edges are either plastic wrapped or heat sealed.

Dropsy, in U.S. Pat. No. 4,722,474 shows a package with an internal thermoformed seam free plastic liner. One embodiment also shows a plastic coated outer surface with the outer and inner films being heat sealed along the edges. The plastic coating is apparently applied after formation of the container. French Patent No. 2,645,831 is closely related.

WO 94/02364 describes a container blank formed entirely of a corrugated of thermoplastic material. Edges and all other openings are sealed to add strength and prevent entry of liquid.

WO 90/09927 shows a thermoplastic film encapsulated shipping container blank similar to one made by the process of the present invention. A plastic film is applied to both sides of a corrugated shipping container blank and subsequently heat sealed around all edges and openings. The document is strangely silent in regard to any process steps by which the encapsulated container blank is prepared.

The present invention describes an efficient process by which a plastic encapsulated corrugated shipping container blank may be formed.

SUMMARY OF THE INVENTION

The present invention is directed to a method of fully encapsulating corrugated shipping container blanks within a moisture resistant plastic film. The method requires a source of thin, thermobondable, thermoplastic film. This is applied to both sides of a container blank. At a downstream location the film is heated on both sides of the blank to a sufficient temperature so that the film bonds to the blank without additional adhesive. The opposing film layers sag to contact each other along the edges and over the area of any openings and are thermobonded to form seals. After a brief cooling period, excess film along the edges and within any openings is die cut or otherwise removed, leaving the sealed edges intact.

Most preferably, the film is applied as a sleeve wrap in which film supply rolls are located above and below a conveyor system, the axes of the rolls being transverse to the direction of travel on the conveyor. The film from each supply roll spans a planar intermediate space perpendicular to the conveyor travel direction and is thermally bonded end-to end to form a continuous sheet. A container blank moving along the conveyor contacts the film and draws it from the rolls as it travels forward. The film is directed into contact against the upper and lower faces of the container blank by rolls or a similar arrangement. When the container blank has passed the planar intermediate location the film at the trailing edge of the container blank is pinched together and thermally bonded. This provides fore and aft seals of the film wrap. The film at the location of this thermal bond is severed transversely so that the seal remains intact on both sides of the severing line. The wrapped container blank continues down the conveyor line and the film from the supply rolls is again bonded together end-to-end, ready to be engaged by the following container blank. A heating station follows in which the film is bonded to the container blank. At this point the film sags into any slits and other openings and the upper and lower films are bonded together where in contact with each other. Some shrinkage of the film occurs at this time causing the seals to contract tightly against any exposed edges. A die cutter opens the slits and cutouts while keeping the seals intact. The container blank is now fully encapsulated with continuous seals around the peripheral edges and corner slits or other cutout portions and is ready to be formed into a moisture resistant shipping container.

The container when so encapsulated can be readily recycled since the film is easily removed in a repulper and can be readily separated from the fiber portion in conventional fiber cleaning equipment.

It is an object of the invention to provide a method for preparing a highly moisture resistant shipping container.

It is a further object to prepare a moisture resistant shipping container that can be readily recycled.

These and many other objects will become readily apparent upon reading the following detailed description taken in conjunction with the drawings.

BRIEF DESCRIPTION OF THE DRAWINGS

FIG. 3 is a section through line 3—3 of FIG. 1

FIG. 4 is a portion in cross section showing greater detail of the edge seal of the plastic coating.

DETAILED DESCRIPTION OF THE PREFERRED EMBODIMENTS

The thermoplastic, thermobondable plastic film used in the present method may be a single layer film but is preferably a multilayer film comprising at least first and second layers. When a two layer film is used the layers should have a melting point difference of at least about 15° C. (25–30° F.). Most typically the film will be a coextruded film having an outer layer of high density polyethylene with a melting point of about 130° C. (265–275° F.) and an inner layer with a melting point of about 110° C. (230–240° F.). The inner layer is used adjacent to and is thermobondable to the corrugated paper shipping container blank. A most preferred film is a coextruded film as just described with a third metallocene composition adjacent the low density polyethylene layer to promote good adhesion to the container blank surface. A film of this type is available from Golden Eagle Extrusions Inc., Loveland, Ohio, and from other suppliers. Other film compositions such as those based on polypropylene, poly(vinyl chloride), polyesters, or films having one or more layers of one of these compositions coextruded with one of the other compositions. Film thickness is not critical but will generally be within the range of about 0.019–0.075 mm (0.00075–0.003 in). Most typically the film will be about 0.025 mm (0.001 in) in thickness.

The film may be applied to each side of the shipping container blank by any method. Most preferably it is applied by the sleeve wrap method described earlier.

In addition to providing a highly water resistant container, the present method can provide a product that is significantly superior in appearance to conventional printed containerboard blanks. This is accomplished by using a pigmented film on at least the outer surface of the ultimate shipping container. The pigmented film can be printed before or after application to the container blank. Image brightness and clarity is outstanding in comparison to that usually seen on printed containerboard conventionally made using an outer linerboard ply having an integrally formed thin white surface layer.

Figure 1:
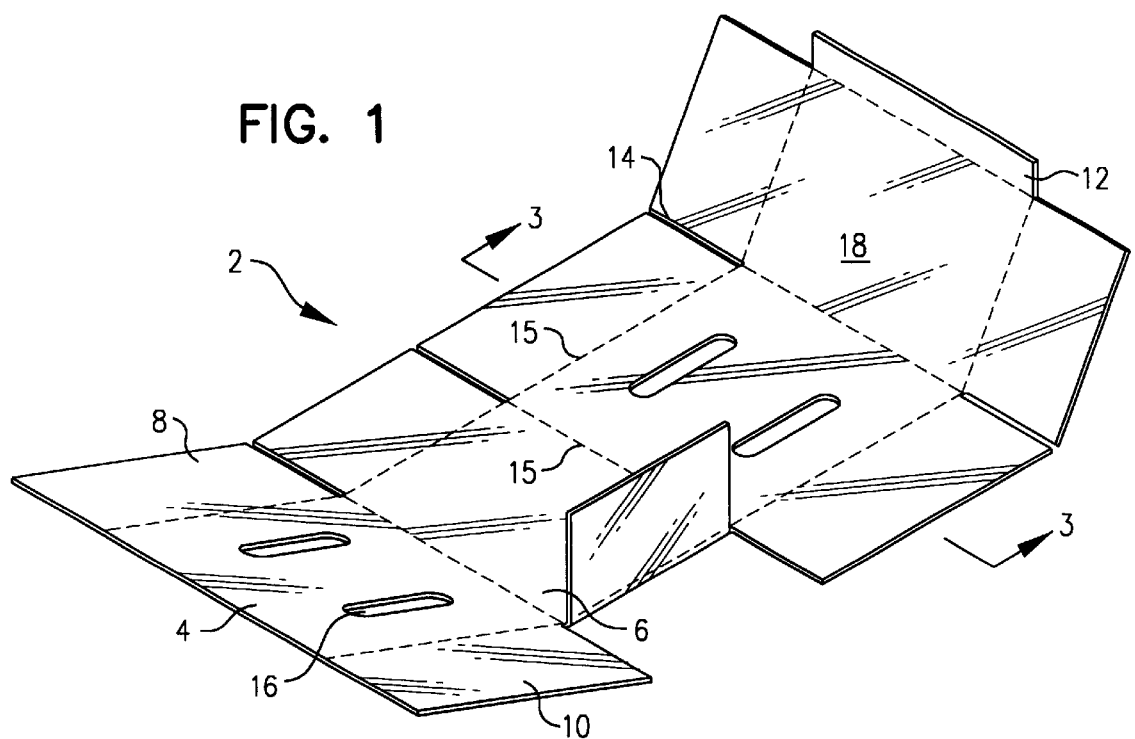
FIG. 1 shows a plastic encapsulated corrugated paperboard box blank ready to be formed into a ventilated shipping container.

The method by which the product is prepared is best understood by reference to the drawings. FIG. 1 represents a completed containerboard blank 2 having side walls 4, end walls 6, and top and bottom flaps 8, 10. A single flap 12 is provided to make the manufacturers joint when the container is assembled. Cutouts 14, and score lines 15 are provided to facilitate assembly. The entire upper and lower surfaces are covered with a plastic film 18 with the two layers sealed to each other along the edges and at all openings.

Figure 2:
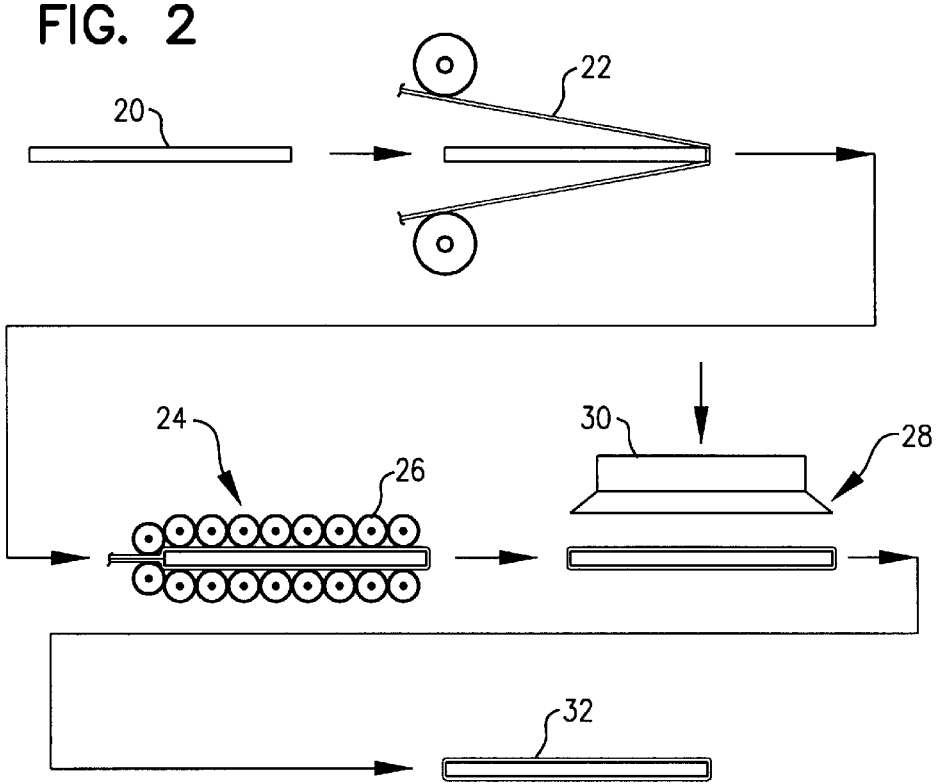
FIG. 2 diagramatically illustrates the process of encapsulating a container blank within a plastic film

A preferred method of forming the product is seen in FIG. 2. A container blank 20 is fed into a sleeve wrap station where plastic film is supplied from upper and lower rolls, not shown. The container blank moves along a conveyer and withdraws the film from the supply rolls as it moves forward. The film is pressed against the container blank and then heat sealed and severed at the trailing edge. Film from the two supply rolls is reunited by the heat seal and is ready to receive the following container blank. A heating station 24 bonds the film to the container blank. As shown here, heated rolls 26 perform this function but other heating means, such as infra red or a heated press, can be equally suitable. During heat application at station 24 the film is heated on both sides so that is softened to the point where it sags into all openings, such as slits 14 and cutouts 16, and around all of the peripheral edges. At the sag locations the upper and lower films contact and bond to each other as is best seen in FIG. 3.

FIG. 3 shows a cross section along line 3—3 of FIG. 1. The container blank 20 has upper and lower paper linerboards 40 bonded to an interior corrugated medium 42. The linerboards are overlaid with plastic films 44. As shown, the film sags into the score lines 46 and into the cutout openings 48. The two films meet and form bonds 50 at the edges and 52 at cutout locations 48. FIG. 4 shows an enlarged view at one of the cutout locations. Here, the film bridging the cutout serving as a ventilation opening has been removed by a die cutter leaving the edge bonds 52.

It will be evident to those skilled in the art that many variations can be made in the described process without departing from the spirit of the invention. It is the inventors intent that these variations should be included within the scope of the invention if encompassed within the following claims.

We claim:

1. A method of encapsulating corrugated shipping container blanks with moisture resistant plastic film which comprises:

providing a source of a thermobondable, thermoplastic film;

applying the film to both sides of a shipping container blank and severing the film from the source;

heating the film covered blank to a sufficient temperature so that the film bonds to the blank and sags around the outer edges of the blank and into any cutouts and openings so that the film on one side contacts and bonds to the film on the other side of the blank producing seals around the outer edges and edges of the cutouts; and removing surplus film around the outer edges and cutouts to open cutouts while preserving all edge seals.

2. The method of claim 1 in which the thermoplastic film comprises at least first and second layers, said layers having a difference in melting points of at least about 15° C., said first layer having the lower melting point and being located adjacent the shipping container blank.

3. The method of claim 2 in which the lower melting point layer has a melting point of at least about 110° C. and the second layer has a melting point of at least about 130° C.

4. The method of claim 1 in which the plastic film has a thickness of about 0.019–0.075 mm (0.00075–0.003 inches).

5. The method of claim 2 in which the plastic film has a thickness of about 0.019–0.075 mm (0.00075–0.003 inches).

6. The method of claim 1 in which the plastic film is a coextruded multi-layer film having at least one layer of high density polyethylene and one of low density polyethylene, the low density layer being located closest to the shipping container blank.

7. The method of claim 2 in which the plastic film is a coextruded multi-layer film having at least one layer of high density polyethylene and one of low density polyethylene, the low density layer being located closest to the shipping container blank.

8. The method of claim 1 in which the film is applied to the shipping container blank by a sleeve wrap technique.

9. The method of claim 1 in which surplus film is removed by a die cutter.

10. The method of claim 1 in which the film is pigmented.

11. The method of claim 10 in which the film is printed before or after application to the shipping container blank.

12. The method of claim 1 which further comprises forming the encapsulated container blank into a shipping container.

* * * * *